United States Patent [19]

Poppy

[11] 3,755,618

[45] Aug. 28, 1973

[54] SHUNT COLOR KILLER CIRCUIT

[75] Inventor: Dwight J. Poppy, Arlington Heights, Ill.

[73] Assignee: Zenith Radio Corporation, Chicago, Ill.

[22] Filed: Mar. 2, 1972

[21] Appl. No.: 231,317

[52] U.S. Cl. .......... 178/5.4 CK
[51] Int. Cl. .......... H04n 9/48
[58] Field of Search .......... 178/5.4 CK, 5.4 AC

[56] References Cited

UNITED STATES PATENTS

| | | | |
|---|---|---|---|
| 3,604,842 | 9/1971 | Harwood | 178/5.4 AC |
| 3,626,089 | 12/1971 | Cecchin et al. | 178/5.4 AC |

*Primary Examiner*—Robert L. Griffin
*Assistant Examiner*—George G. Stellar
*Attorney*—Nicholas A. Camasto et al.

[57] ABSTRACT

A color killer circuit is provided for disabling the chrominance processing channel when the signal strength of the received chrominance signals drops below a selectable, predetermined level. The circuitry, which is suitable for fabrication on a monolithic integrated circuit, includes a semiconductor arrangement coupled in shunt with a differential amplifier between a source of unidirectional potential (B+) and the output of a chroma driver amplifier. Whenever the chrominance signal strength is at or above the selectable, predetermined level indicative of normal color reception, the chroma driver, responsive to chrominance signals applied at its input, develops a chrominance-modulated current which is conducted through the differential amplifier to the chroma demodulator. On the other hand, whenever the chrominance signal strength is below the selectable, predetermined level, the semiconductor arrangement is switched to its conductive state by a control network in response to control signals representative of the chrominance signal strength. In its conductive state, the semiconductor arrangement presents an alternate low impedance current path to the chrominance-modulated current diverting it from the differential amplifier and thereby preventing chroma reproduction.

7 Claims, 2 Drawing Figures

SHUNT COLOR KILLER CIRCUIT

BACKGROUND OF THE INVENTION

The present invention relates generally to color television receivers and more particularly to a color killer circuit for inclusion therein as a portion of a monolithic integrated circuit. The color killer circuitry is effective to divert chrominance-modulated current through the color killer circuit and away from a chroma amplification stage when the chrominance signal strength of the received signal falls below a selectable, predetermined level.

In accordance with presently established NTSC standards, a color television receiver must be able to reproduce both color and monochrome signal transmissions. Accordingly, color television receivers generally provide, in addition to the luminance processing channel, a chrominance processing channel for reproducing the color portion of the reproduced image. Since spurious "color noise" would result if the chrominance processing channel remained fully functional during monochrome reception, it has been found desirable to disable the chrominance processing channel when the chrominance signal strength falls below the level required for proper color reproduction.

In today's more sophisticated television receivers, increasing emphasis has been put on utilizing monolithic integrated circuits to reduce cost and improve reliability. The inclusion of color killer circuitry on a chrominance processing monolithic integrated circuit, however, has heretofore presented certain problems. Typical prior-art color killer circuits incorporated therein have employed a Schmitt trigger to redirect current between transistors in a chroma amplification stage of the differential amplifier type. In such circuits, one transistor usually serves as the output electrode to pass amplified chrominance-modulated current to the chroma demodulator, while the other transistor is coupled to a source of operating potential. Thus, when the chrominance signal strength falls below a certain level, the Schmitt trigger switches between its bistable states to divert the chrominance-modulated current from the chroma demodulator to the other transistor. However, the Schmitt trigger requires a certain quiescent operating current regardless of whether or not the color killer is functioning. The resultant power dissipated by the monolithic integrated circuit is substantially increased due to the inclusion of the Schmitt trigger, and accordingly, it is desirable to eliminate the Schmitt trigger to reduce power dissipation.

Another problem associated with the Schmitt trigger color killer is that of the "hysteresis" between the level of chrominance signal strength at which the color killer is activated and the subsequent level at which the color killer is deactivated. That is, the chrominance signal strength level required to turn the color killer circuit off does not coincide with the level below which the chrominance signal strength must drop before it is turned on. Thus, while the chrominance signal strength may drop to a level where the color killer deactivates the chroma channel, subsequent chrominance signals must substantially exceed that level before the chrominance channel will be reactivated. While a certain amount of hysteresis may be desirable, it must be minimized to some degree.

Furthermore, when a Schmitt trigger is employed, the coplexity of its associated circuitry requires several additional pins on the monolithic integrated circuit for making external connections thereby introducing reliability problems. While minimal in each individual receiver, the cost of additional pins when considered in light of the mass quantity of television receivers produced becomes quite substantial.

SUMMARY OF THE INVENTION

Accordingly, it is an object of the invention to provide new and improved circuitry for automatically disabling a selected portion of the chrominance processing channel in a color television receiver which overcomes the aforenoted disadvantages and deficiencies of prior circuits.

A more particular object of the invention is to provide an improved color killer circuit which does not dissipate any power when it is in its inactive state.

A further object of the invention is to provide an improved color killer circuit which does not conduct any quiescent current therethrough when the color killer is inactive.

Another object of the invention is to provide a color killer circuit with less hysteresis between the levels required to turn-on and turn-off the color killer circuit than has been heretofore found in typical television receivers.

In accordance with the present invention, an improved color killer circuit is provided for disabling a selected portion of the chrominance processing channel in a color television receiver whenever the chrominance signal strength falls below a selectable, predetermined threshold level. In a preferred embodiment, the color killer circuit includes a chrominance amplifier for amplifying the chrominance signals derived from received television signals. Shunt means are coupled to the chrominance amplifier for diverting the chrominance signals from the chrominance amplifier whenever the shunt means is conductive. Control signals representative of the chrominance signal strength are coupled to control means which are associated with the shunt means to switch the shunt means between conductive and non-conductive states responsive to the chrominance signal strength.

BRIEF DESCRIPTION OF THE DRAWINGS

The features of this invention which are believed to be novel are set forth with particularity in the appended claims. The invention together with its further objects and advantages thereof may be best understood, however, by reference to the following description taken in conjunction with the accompanying drawings, in which like reference numerals refer to like elements in the several figures and in which:

PREFERRED EMBODIMENT OF THE INVENTION

Figure 1:
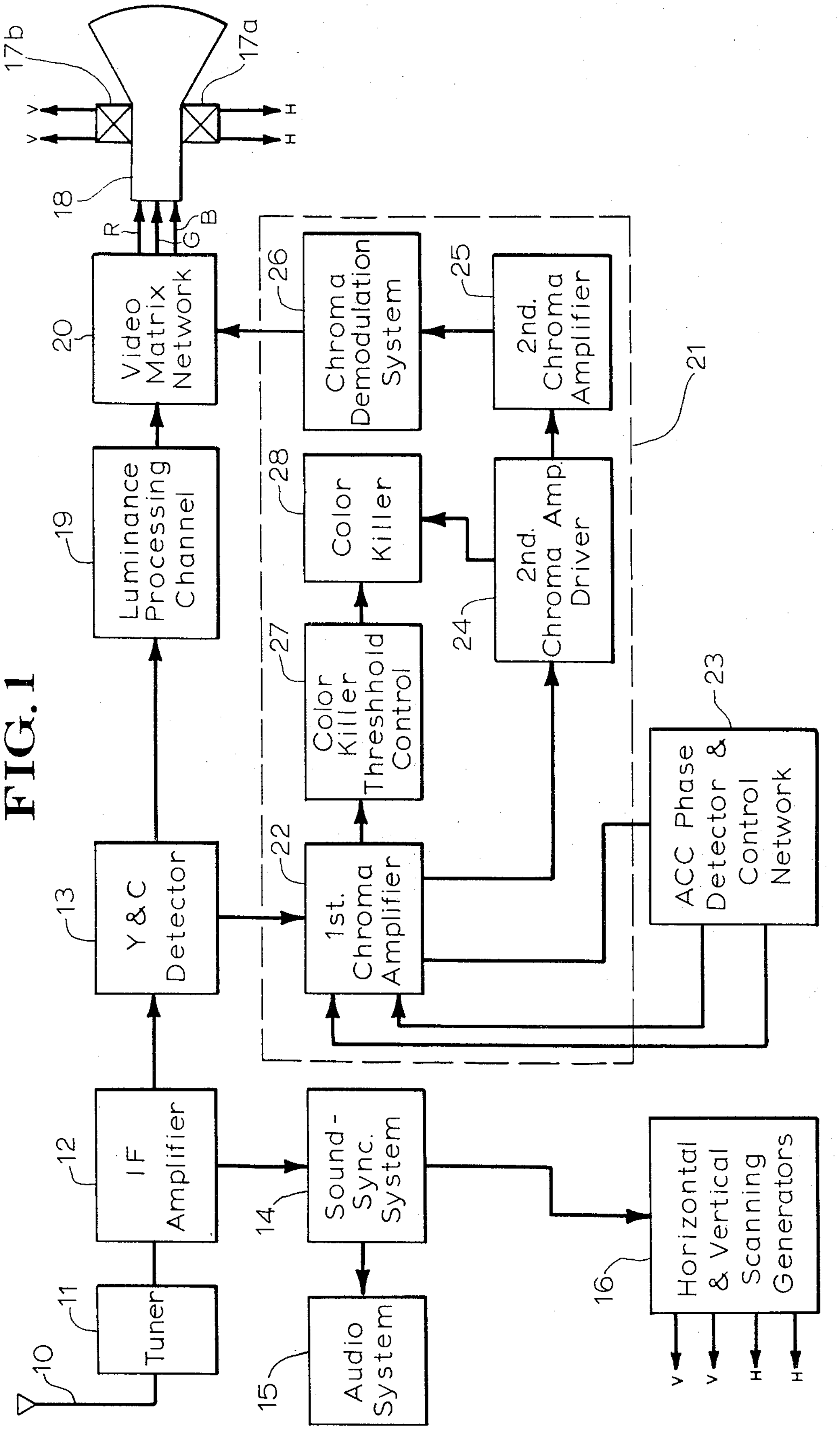
FIG. 1 is a block diagram of a television receiver which includes color killer circuitry in accordance with one embodiment of the invention.

Referring now to FIG. 1, a color television receiver is shown which includes color killer circuitry in accordance with the present invention. The receiver includes an antenna 10 coupled to an input tuner stage 11 which amplifies the received composite television signal and converts the same to an intermediate frequency in the well-known manner. The amplified and converted signal is coupled to an intermediate-frequency amplifier 12 where it is further amplified and coupled to a luminance (Y) and chrominance (C) detector 13, and also to a sound-sync system 14. The output signal from sound-sync system 14, in turn, is processed and amplified by audio system 15 for reproducing the audio portion of the received signal. Sound-sync system 14 is also coupled to horizontal and vertical deflection signals for application to appropriate deflection yokes 17*a* and 17*b* positioned about the image reproducer 18 so as to effect reproduction of the televised image in the conventional manner.

The image reproducer 18 may be a conventional shadow mask cathode-ray tube comprising a tri-color image screen or target (not shown) to be selectively scanned by a group of three electron beams developed by individual guns within the tube.

The detected video signal from Y & C detector 13, which represents the luminance components of a color telecast, is coupled to the luminance processing channel 19. In turn, the amplfied signal from luminance processing channel 19 is applied to the video matrix network 20 as one of the informational inputs thereto.

The chrominance processing channel, identified generally by dashed block 21, is fabricated as a monolithic integrated circuit to amplify and demodulate chrominance signals derived from the Y & C detector 13. More particularly, chrominance signals from the Y & C detector 13 are applied to the first chroma amplifier 22 from which the resulting amplified chrominance signals are applied to an automatic chrominance control (ACC) phase detector and control network 23. Therein, reference burst signals indicative of chrominance signal strength are compared with signals from a reference oscillator (not shown) so as to generate a chrominance channel control (ACC) signal. This control signal upon being applied to the first chroma amplifier 22 is effective to selectively control the gain of this stage in response to variations in the amplitude of the reference burst signals and thereby attempts to maintain a constant output chrominance signal level from the first chroma amplifier 22. The amplified chrominance signals from the first chroma amplifier 22 are further coupled to the second chroma amplifier driver 24 which, in turn, provides the second chroma amplifier 25 with a chrominance-modulated current source. After further amplification by the second chroma amplifier 25, the chrominance-modulated current is coupled to the chroma demodulation system 26 where the required color signals are developed for application to the video matrix network 20, forming the other of its informational inputs. Appropriate matrixing occurs within matrix network 20 such that signals containing the correct brightness, hue and color saturation information are derived and applied to the appropriate control electrodes of the image reproducer 18 in a manner understood in the art. In the embodiment of the receiver as herein shown, the color signals R, G and B are applied directly to the cathodes of the image reproducer 18.

As thus far described, the receiver is entirely conventional in construction and operation such that further and more particular operational description should not be necessary. More particular consideration, however, may now be given to that portion of the receiver which relates to the preferred embodiment of the present invention, and in general constitutes color killer circuitry operative in cooperation with the chrominance processing channel identified generally at 21.

In FIG. 1, the first chroma amplifier 22 also utilizes the chrominance channel control (ACC) signal coupled from the ACC phase detector and control network 23 to generate a control voltage representative of the signal strength of the chrominance signals. When the chrominance signal strength is inadequate for satisfactory color reproduction, the control voltage crosses a selectable, predetermined level, and the color killer threshold control 27 activates the color killer 28. Accordingly, the chrominance signals from the second chroma driver 24 are diverted from the second chroma amplifier 25 to the color killer 28. Whenever the control voltage indicates that the chrominance signal strength is adequate, the color killer threshold control 27 switches the color killer 28 to its inactive state, and amplification of the chrominance signals is accomplished in the well-known manner.

Figure 2:
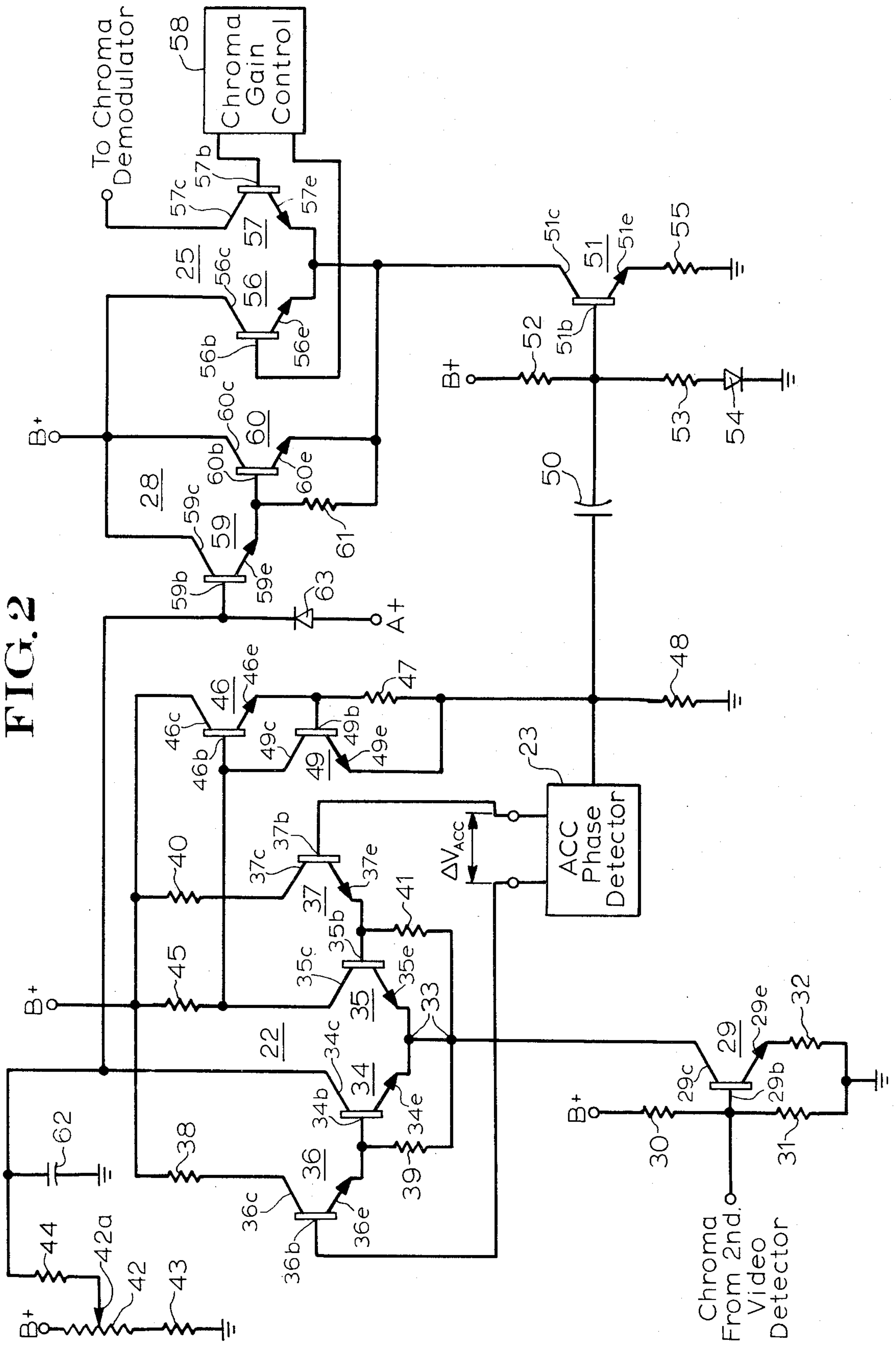
FIG. 2 is a schematic diagram of a portion of the television receiver including the improved color killer circuitry.

The chrominance processing channel 21 is shown in greater detail in FIG. 2. Therein, chrominance information derived from the second video detector (i.e., Y & C detector 13 of FIG. 1) is coupled to the base electrode 29*b* of the first chroma driver transistor 29. Resistors 30, 31 are connected between a source of unidirectional potential (B+and ground to form a voltage divider arrangement for applying a suitable operating bias to the base electrode 29*b*, while the emitter electrode 29*e* is coupled to ground through a resistor 32. The first chroma driver transistor 29 serves as a source of amplified chrominance-modulated current for the first chroma amplifier 22 by virtue of the connection between collector electrode 29*c* and the junction 33 of the emitter electrodes 34*e*, 35*e* of transistors 34, 35, respectively.

Transistors 36 and 37 are interconnected with transistors 34 and 35, respectively to form a differential amplifier having two pairs of Darlington-connected transistors. The emitter electrode 36*e* of transistor 36 is directly connected to the base electrode 34*b*, and the collector electrode 36*c* is coupled to B+ through a resistor 38. A resistor 39 also couples the emitter electrode 36*e* to the junction 33. Similarly, the emitter electrode 37*e* of transistor 37 is directly connected to the base electrode 35*b* while the collector electrode 37*c* is coupled to B+ through a resistor 40, and another resistor 41 couples the emitter electrode 37*e* to the junction 33. The tap 42*a* of a potentiometer 42 connected in series with a resistor 43 between B+ and ground couples an operating potential through resistor 44 to the collector electrode 34*c*. Transistor 35, on the other hand, derives its operating potential by virtue of a resistor 45 coupled between its collector electrode 35*c* and B+. Further, the previously mentioned ACC control voltage from the ACC phase detector 23 is applied across the base electrodes 36*b*, 37*b* of transistors 36, 37, respectively, to vary the current conduction levels in each of the transistor pairs of the differential amplifier.

Operationally, whenever the signal strength of the chrominance signals applied to the base electrode 29*b* of the driver transistor 29 reaches the level required for satisfactory color reproduction, the ACC control voltage applied to base electrode 37*b* will be such that a constant level of chrominance-modulated current flows through transistor 35. Concurrently, the ACC control voltage will bias base electrode 36*b* to a point where the remaining chrominance-modulated current flows through transistor 34. Since it is desirable to maintain a constant level of chrominance-modulated current at all points preceding the manual color level control so that the chrominance saturation of the reproduced picture will not change with varying signal strength, the resultant constant-amplitude chrominance signals available at collector electrode 35*c* are coupled to later stages of chrominance processing. Accordingly, the chrominance signals at collector electrode 35*c* are applied to the base electrode 46*b* of transistor 46 comprising an emitter follower. The collector electrode 46*c* is connected to B+ while the output chrominance signals at emitter electrode 46*e* are coupled to the ACC phase detector 23 through a voltage divider network formed by resistors 47, 48 connected between emitter electrode 46*e* and ground. As previously mentioned, the ACC phase detector 23 develops a control voltage for maintaining a constant level of chrominance information at the collector electrode 35*c*. Transistor 49 is included to prevent the emitter follower 46 from being destroyed by excessive current generated therein. Thus, the collector electrode 49*c* is connected to the emitter follower base electrode 46*b*, the base electrode 49 *b* is connected to the emitter follower emitter electrode 46*e*, and the emitter electrode 49*e* is connected to the lower terminal of resistor 47. The potential developed at collector electrode 49*c* effectively reduces the bias on emitter follower base electrode 46*b* responsive to the monitoring of excess potentials across the base-emitter junction of transistor 49.

The amplified chrominance-modulated current from emitter follower 46 is also coupled through a capacitor 50 to the base electrode 51*b* of the second chroma amplifier driver transistor 51. A biasing network comprising resistor 52, resistor 53, and diode 54 is coupled between B+ and ground to further provide the proper operating potential at the base electrode 51*b*. An emitter resistor 55 is included between the emitter electrode 51e and ground while the collector electrode 51*c* is connected directly to the junction of the emitter electrodes 56*e*, 57*e* of a differential amplifier 25 comprising transistors 56, 57. As in most differential amplifier arrangements the emitter electrodes 56*e*, 57*e* of the two transistors 56, 57 are directly connected. As presently utilized, the collector electrode 56*c* of transistor 56 is connected directly to B+ while the collector electrode 57*c* of transistor 57 couples amplified chrominance signals to the chroma demodulator. The base electrodes 56*b*, 57*b* are coupled to the chroma gain control 58.

In operation, the second chroma driver transistor 51 amplifies the chrominance signals applied to its base electrode 51*b* and thus serves as a chrominance-modulated current source for the differential amplifier 25. When the chrominance-modulated current is coupled to the emitter electrodes 56*e*, 57*e*, a selectable portion will be conducted through transistor 57, while the remaining current is conducted through transistor 56. The amplified chroma information available at collector electrode 57*c* is then coupled to the chroma demodulator for development of the chrominance signals necessary for proper color reproduction on the screeen of the cathode-ray tube. By adjusting the chroma gain control 58, the respective biases applied to transistor 56 and transistor 57 can be changed to vary the amount of chroma information conducted through transistor 57 and on to the chroma demodulator. In this way, a manual color level control is provided.

In accordance with the present invention, color killer circuitry is provided which, in conjunction with the chrominance processing channel, is effective to divert the amplified chrominance-modulated current developed by the second chroma driver transistor 51 from the differential amplifier 5 when the strength of the chrominance signal drops below a predetermined, selectable level. The color killer 28 comprises a pair of transistors 59, 60 connected in the well-known Darlington configuration. That is, the collector electrodes 59*c*, 60*c* of both transistors are connected to B+ while the emitter electrode 59*e* of transistor 59 is directly connected to the base electrode 60*b* of transistor 60. A resistor 61 couples the emitter electrode 59*e* to emitter electrode 60*e* which, in turn, is connected to the collector electrode 51*c* of second chroma driver transistor 51. Further, the collector electrode 34*c* of transistor 34, bypassed to ground by capacitor 62, is connected to the base electrode 59*b*. A diode 63 having its cathode coupled to base electrode 59*b* and its anode coupled to another source of unidirectional potential (A+) is also included.

Operationally, when the signal strength of the received chrominance signals applied to the base electrode 29*b* of driver transistor 29 exceeds the level required for satisfactory chroma reproduction, the ACC control voltage developed by ACC phase detector 23 applies a differential bias voltage, $\Delta V_{ACC}$, between base electrode 36*b* and base electrode 37*b*. Consequently, as long as the signal strength exceeds this level, the bias on base electrode 37*b* maintains a constant current flow through transistor 35, and the remaining current developed by driver transistor 29 is conducted through transistor 34. As more current is diverted through transistor 34, the current supplied by the B+ source through the potentiometer 42 and resistor 44 increases such that the potential developed at collector electrode 34*c* decreases. This potential, in turn, is coupled to the base electrode 59*b* in the color killer circuit, but as long as the potential at the cathode of diode 63 is below the A+ potential at the anode, diode 63 will conduct. Accordingly, transistors 59, 60 remain non-conductive, and the color killer 28 is inactive permitting subsequent amplification of the chroma information by the second chroma amplifier 25. It is apparent that by adjusting the tap 42*a* of potentiometer 42 to obtain a selected voltage for a particular level of chrominance signal strength, the signal strength level at which the color killer is activated may be predetermined.

When, on the other hand, the chrominance signals from the second video detector do not exceed the level required to reproduce a satisfactory color picture, the resultant ACC control voltage, $\Delta V_{ACC}$, biases base electrode 37b more positively than it does base electrode 36b in an attempt to provide the required level of chroma information at collector electrode 35*c*. Consequently, most of the chrominance-modulated current is conducted through transistor 35 while the little remaining is drawn through transistor 34 thereby providing a higher potential at collector electrode 34*c* due to the smaller voltage drop across the potentiometer 42 and resistor 44. This higher potential once again is coupled to the base electrode 59*b* in the color killer circuitry and hence to the cathode of diode 63. Since this potential exceeds the A+ potential applied to its anode, diode 63 will be non-conductive and the resultant bias at base electrode **59*b* activates the color killer 28. When conductive, the color killer 28 comprising the Darlington-connected transistors 59 and 60 provides a low impedance path for the chrominance-modulated current associated with the second chroma driver transistor 51. This low impedance, in effect, parallels the higher impedance of the differential amplifier 25 comprising transistors 56 and 57 thereby diverting the chrominance-modulated current away from the differential amplifier 25. Consequently, transistors 56 and 57** conduct little if any current and are effectively prevented from passing amplified chroma information to the chroma demodulator thereby assuring that an unsatisfactory color picture is not reproduced.

Since the color killer cicuit 28 does not generate any quiescent operating current, regardless of whether or not the color killer is operative, as opposed to previously mentioned systems, there is no increase in power dissipation due to the color killer itself. Accordingly, the color killer circuitry of the preferred embodiment results in substantially less power dissipation when the chrominance processing channel is fabricated as an integrated-circuit package. Furthermore, the hysteresis between the level of color killer voltage at collector electrode 34c required to activate the color killer 28 and that required to deactivate it is greatly reduced because the color killer 28 responds solely to the bias applied to base electrode **59*b*. Since, transistor 59** will turn-off as well as turn-on at very nearly the same potential, hysteresis is effectively reduced.

The embodiment disclosed herein is essentially similar to the circuitry of a commercialized version of the invention fabricated as an integrated circuit package. While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

I claim:

1. In a television receiver having chrominance amplifier means, coupled to a B+ reference potential for amplifying chrominance signals derived from received television signals, said chrominance amplifier means developing chrominance modulated current from said chrominance signals; and including means for developing control signals indicative of chrominance signal reception, a color killer circuit comprising in combination:

shunt means coupled between said B+ reference potential and said chrominance amplifier means, said shunt means comprising a transistor switch having an input circuit and an output circuit coupled across the output of said chrominance amplifier means, said shunt means being normally non-conductive and being conditionable to a conductive state for shunting the output of said chrominance amplifier means; and control means including a source of second reference potential establishing a threshold coupled to the input circuit of said shunt means for switching said shunt means into said conductive state responsive to said control signals reaching said threshold.

2. A color killer circuit in accordance with claim 1 wherein said threshold is established by a diode having a first electrode coupled to the input of said shunt means and a second electrode coupled to said source of second reference potential for determining the conduction threshold of said transistor switch, said diode being effective to switch said shunt means into said conductive state whenever the level of said control signals crosses said threshold.

3. A color killer circuit in accordance with claim 2 wherein said means for developing control signals indicative of chrominance signal reception include a variable impedance for selecting a predetermined level of said control signals to represent a desired signal strength of said chrominance signals.

4. A color killer circuit in accordance with claim 1 wherein said chrominance amplifier means includes a chrominance output stage and wherein said transistor switch comprises first and second transistors, said first transistor having a collector-emitter junction interconnected between said B+ reference voltage and the base electrode of said second transistor and said second transistor having a collector-emitter junction coupled to said B+ reference potential across said chrominance output stage, said source of second reference potential comprising a diode coupled directly to said base electrode of said first transistor.

5. A color killer circuit in accordance with claim 1 wherein said chrominance amplifier means includes first and second chrominance amplifiers, said second chrominance amplifier comprising driver means coupled to said first chrominance amplifier and differential amplifier means coupled to said driver means for amplifying said chrominance-modulated current said said shunt means being coupled between said B+ reference potential and the junction of said driver means and said differential amplifier means.

6. A color killer circuit in accordance with claim 5 wherein said driver means comprises a transistor having a base electrode coupled to said first chrominance amplifier, an emitter electrode coupled to ground and a collector electrode coupled to said differential amplifier means.

7. A color killer circuit in accordance with claim 5, further including chroma gain control means, and wherein said differential amplifier means comprises third and fourth transistors having interconnected emitter electrodes coupled to said driver means, said third transistor having a collector electrode coupled to said B+ reference potential and said fourth transistor having a collector electrode serving as an output for a chroma demodulation system, said third and said fourth transistors having respective base electrodes coupled to said chroma gain control means for varying the level of said chrominance-modulated current conducted through said fourth transistor.

* * * * *